Aug. 11, 1959  Z. W. WILCHINSKY ET AL  2,899,379
DESORPTION OF ZEOLITIC MOLECULAR SIEVES USING AMMONIA
Filed Jan. 9, 1956
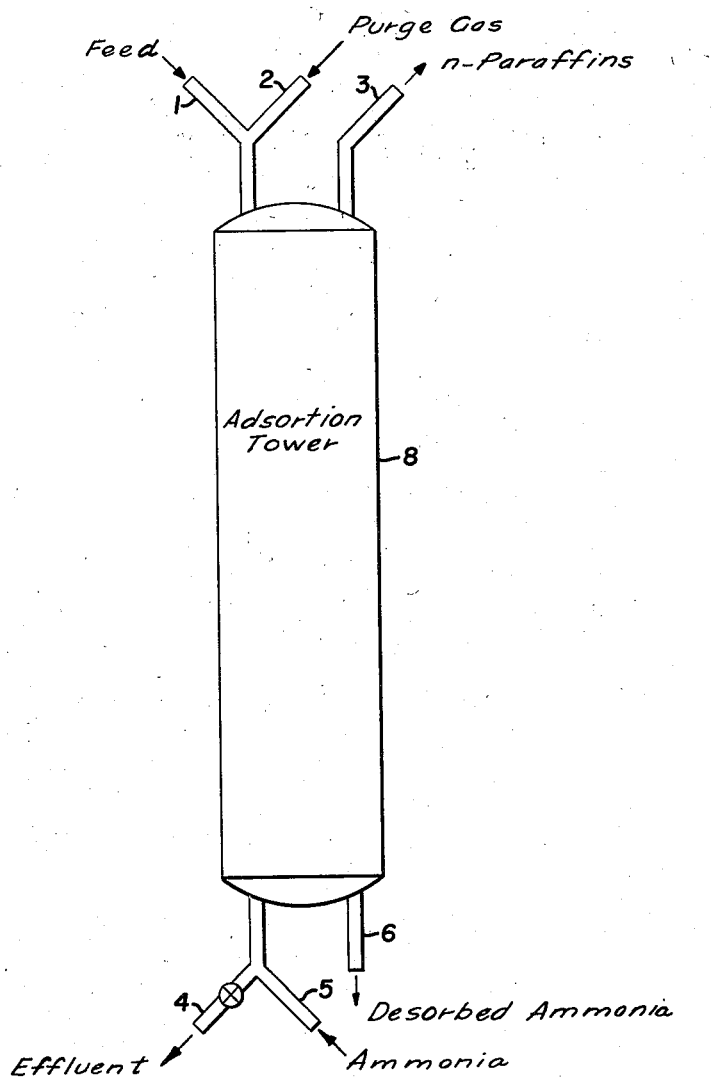
Zigmond W. Wilchinsky
Charles E. Thompson  Inventors
By *Richard H. Nagel*  Attorney ns
2,899,379

DESORPTION OF ZEOLITIC MOLECULAR SIEVES USING AMMONIA

Zigmond W. Wilchinsky, Westfield, and Charles E. Thompson, Fanwood, N.J., assignors to Esso Research and Engineering Company, a corporation of Delaware Application January 9, 1956, Serial No. 557,996

7 Claims. (Cl. 208—95)

The present invention relates to a process for separating and segregating straight chained hydrocarbons from mixtures thereof with branch chained and/or cyclic or aromatic hydrocarbons. More particularly, the present invention relates to the adsorption of relatively straight chain, normal hydrocarbons from isomeric branch chained and cyclic compounds employing a class of natural or synthetic adsorbents termed, because of their crystalline structure, molecular sieves. Still more particularly, the present invention relates to an improved desorption process whereby the hydrocarbon adsorbed on the sieve is recovered in a manner considerably more efficient and economical than hiterto found possible.

It has been known for some time that certain zeolites, both naturally-occurring and synthetic, have the property of separating normal from isomeric branch chained hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3–6 Angstrom units to 12–15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen and an alkali and/or alkaline earth element, e.g. sodium and/or calcium, magnesium, etc. Analcite has the empirical formula $NaAlSi_2O_6.H_2O$. Barrer (U.S. 2,306,610) teaches that all or part of the sodium is replaceable by calcium to yield, on dehydration, a molecular sieve having the formula $(CaNa_2)Al_2Si_4O_{12}.2H_2O$. Black (U.S. 2,522,426) describes a synthetic molecular sieve having the formula $4CaO.Al_2O_3.4SiO_2$. A large number of other naturally-occurring zeolites having molecular sieve activity, i.e. the ability to adsorb a straight-chain hydrocarbon and exclude the branch chain isomers, are described in an article "Molecular Sieve Action of Solids" appearing in Quarterly Reviews, vol. III, pp. 293–330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

Though it has in the past been proposed to make these separations, i.e. of normal from isomeric hydrocarbons and aromatics by molecular sieves, and though excellent and selective separations of all constituents have been realized, a serious problem has arisen when it was attempted to desorb and regenerate the molecular sieve or zeolite. Conventional means, such as steaming, purging with an inert gas such as nitrogen or methane, evacuation, all have proven unsatisfactory. In commercial applications it is necessary to employ a cyclic operation, i.e. an adsorption step followed by desorption and regeneration of the sieve, followed by a second adsorption step, etc. The desorption means enumerated above have been found unsatisfactory, and in some cases causing deterioration of the zeolite and marked decline in adsorptive capacity. For instance, in a process wherein a virgin naphtha fraction was treated with a synthetic molecular sieve having a pore diameter of 5 Angstroms to separate normal from branch chain constituents and thereby increase the octane number, and the sieves desorbed and regenerated between cycles by steam stripping followed by nitrogen flushing, the sieves decreased in capacity to 59% of fresh capacity after only three cycles. Similarly, the effect of continued treatment of the sieves with steam at the high stripping temperatures of about 600 to 900° F. is to cause deterioration.

It is therefore the principal object of the present invention to set forth an improved method of desorbing and stripping hydrocarbons adsorbed in the uniform pores and cavities of certain natural or synthetic zeolites, customarily called molecular sieves.

It is also a purpose of the present invention to provide a desorption means which prolongs substantially the life of the molecular sieve.

Other and further objects and advantages of the present invention will appear in the following more detailed description and claims.

In accordance with the present invention, the difficulties encountered in conventional methods of desorbing are avoided by displacement of adsorbed hydrocarbons, such as n-paraffins or n-olefins, with gaseous ammonia. This material has been found to be an excellent desorbent, operable over a wide range of temperature, and particularly below about 400° F., thus avoiding unnecessary contact of the sieve with high temperatures for prolonged periods of time. It removes adsorbed normal paraffins with almost a "piston-like" action. The ammonia itself is simply recovered by heating to 600–800° F., its removal rate is increased if an inert purge gas such as nitrogen is passed over or through the sieve. Contrary to experience with other desorption agents, the adsorptive capacity of the sieve is not significantly decreased when the ammonia is employed as a desorbent in a continuous or cyclic operation.

In operation, a hydrocarbon mixture is passed over a sieve, a portion being preferentially adsorbed, depending upon the size of the pores and the relative polarities of the different molecular species present. Ammonia is then passed over the sieve, and it effectively displaces the adsorbed hydrocarbons at a temperature from about 70° to about 600° F., but preferably below 400° F. Removal of the ammonia is obtained by heating as described supra.

The process of the present invention may be more clearly understood when read in conjunction with the drawing showing an embodiment thereof.

EXAMPLE I

To illustrate the process, light virgin naphtha will be used in the example. A typical light virgin naphtha boiling below 200° F. may contain 20 to 30 vol. percent normal hexane and normal heptane, the remaining material being mostly $C_6$ and $C_7$ branched and cyclic hydrocarbons. On a 5 Angstrom molecular sieve, only the normal paraffins will be adsorbed.

With reference to Figure I, vaporized feed is admitted through line 1 to the adsorption tower 8 which may be at 225° to 400° F. The normal paraffins contained in the feed will be adsorbed by the sieve, and the effluent, leaving by line 4 will contain the branched and cyclic hydrocarbons, which are valuable as motor fuel because of their high octane number. Naphtha is fed into the tower until normal paraffins begin appearing in the effluent. Then ammonia is passed through line 5 into the column. Normal paraffins are desorbed almost completely by the ammonia, and are collected through product line 3.

During the desorption with ammonia, the bed temperature rises due to the heat of adsorption of ammonia. To desorb the ammonia, the bed temperature is further raised, if necessary, to about 700° and the ammonia is desorbed by passing a stream of purge gas through the bed by feed line 2. This additional heat can be supplied by means of preheating the purge gas to about 800° F. Almost any stable gas that is not strongly adsorbed can be used as a purge provided that the gas does not react with the hydrocarbons in the bed. Examples of purge gases that can be used are nitrogen, flue gas, methane, ethane, ethylene, propane, etc. The purge gas should not contain water, $H_2S$, or other highly polar materials that are strongly adsorbed on the sieve.

The desorbed ammonia collected through line 6 can be recovered for reuse or can be used in some other way; for example, it can be combined with spent $H_2SO_4$ and sold as fertilizer.

After the ammonia is desorbed, the bed is cooled to about 200° F. by a suitable liquid passed directly into the bed. For example, the effluent from previous naphtha processing may be used since these molecules will not be adsorbed on the sieve. When the bed has cooled sufficiently, light virgin naphtha is again fed into the unit.

For an uninterrupted process, two or more adsorption columns are used so that the naphtha feed may be processed in one of the units during the regeneration of the other unit or units.

EXAMPLE II

In a modification of the preceding example, a separate cooling liquid is eliminated. The process is carried out in the same manner through the desorption of the ammonia with a hot purge gas. Then instead of cooling the bed with a special cooling liquid, cold naphtha feed is admitted to the bed. The bed temperature will decrease thus favoring adsorption of greater amounts of normal paraffins than at higher temperature.

EXAMPLE III

A further simplification can be achieved by carrying out the adsorption process at a higher temperature and eliminating the purging step. For example, with the bed at 700° F., light virgin naphtha is fed in. Normal paraffins will be adsorbed but in smaller amounts than at lower temperature. For example, the adsorptive capacity of a 5 Angstrom molecular sieve for n-heptane was found to be about 7 wt. percent at 700° F., compared with about 10-12% at 250° F. Normal paraffins adsorbed from the naphtha are desorbed by ammonia at about 700° F. To desorb the ammonia, it is only necessary to pass hot naphtha through the bed. The branched and cyclic hydrocarbons will act as the purge gas leaving the normal paraffins in the pores of the sieve. In order to maintain an average temperature of, say, 700° F., the naphtha feed temperature must be determined so that the bed is not excessively cooled or left too hot. In the former case, desorption of ammonia may be incomplete, and in the latter the adsorptive capacity for normal paraffins will be reduced.

Ammonia thus desorbed is collected with the high octane effluent stream and must be separated from the hydrocarbons.

EXAMPLE IV

The superiority of the ammonia as a desorbent over the use of conventional gaseous desorbents, such as water vapor, nitrogen, methane and the like, is shown by the following:

Among the advantages of using ammonia are the effectiveness of desorption and maintenance of adsorptive capacity. The ammonia removes hydrocarbons from the pores of the molecular sieve by virtue of the high affinity of the sieve for ammonia. By contrast, a purge gas such as nitrogen is not adsorbed strongly and is an ineffective desorbent. For example, practically 100% of adsorbed normal heptane is removed from a sieve at 250° F. when 82 volumes of ammonia per volume of adsorbent were used. Under similar conditions only 23% of the heptane was removed when nitrogen was used. When 146 volumes of nitrogen per volume of sieve were passed through the bed only 30% of the heptane was removed.

By running a series of successive adsorption-desorption cycles, it was found that the adsorptive capacity of the sieve for normal heptane at 250° F., was maintained at a high value. After nine cycles, the adsorptive capacity was 88% of the original value. However, when steam stripping was used, the adsorptive capacity dropped to 40% of its initial value in five cycles. A cycle by cycle comparison of ammonia and steam stripping is given in the following table.

Table

AMMONIA STRIPPING GIVES LONGER SIEVE LIFE THAN STEAM STRIPPING

[Conditions: Normal heptane was adsorbed on 5 A. molecular sieve at 250° F. and desorbed at 250° F.]

| Cycle | Desorbed with $NH_3$ | | Desorption with Steam | |
|---|---|---|---|---|
| | g./100 g. Sieve | Percent of First Cycle | g./100 g. Sieve | Percent of First Cycle |
| 1 | 12.3 | 100 | 13.1 | 100 |
| 2 | 11.6 | 94 | 11.0 | 76 |
| 3 | 11.3 | 92 | 10.7 | 82 |
| 4 | | | 7.6 | 58 |
| 5 | 10.4 | 84 | 5.2 | 40 |
| 6 | 10.1 | 81 | | |
| 7 | 10.4 | 84 | | |
| 8 | 10.3 | 84 | | |
| 9 | 10.8 | 88 | | |

The process of the present invention may be subject to many variations without departing from its scope. The process of the present invention is particularly adapted to be employed in association with various means for upgrading virgin naphthas to form high octane motor fuels. Two such means are catalytic reforming and hydroforming. In the latter process, naphthas are treated at elevated temperatures and pressures in the presence of a catalyst such as platinum with hydrogen under conditions to convert substantial portions of the hydrocarbons to aromatics. The resulting hydroformate is then enhanced in octane value by removal of n-paraffins by the sieves. The adsorbate may then be recovered in accordance with the process of the present invention and recycled to the hydroformer for further conversion.

Furthermore, the use of ammonia may be employed in association with other means of desorbing the sieves, particularly, because of its high affinity for the sieve pore surfaces.

In adsorption processes involving plant streams and solid adsorbents such as "molecular sieves," the adsorptive capacity of the adsorbent may decrease due to the accumulation of so-called poisons. These poisons are tightly adsorbed materials that are not removed in the desorption step of a cyclic adsorption process. For example, n-paraffins can be adsorbed out of a light virgin naphtha with a molecular sieve adsorbent, leaving a high octane raffinate. These paraffins can be desorbed to a large extent by elution with other normal paraffins of a different boiling range, with olefins such as propylene, etc. These elutants would, for practical purposes, be selected cuts of plant streams. After a number of cycles, the adsorbent accumulates poisons that are present in the plant streams. These poisons are in the form of sulfur compounds, $CO_2$, $CO$, $H_2O$, olefins, diolefins, heavier paraffins, etc. Attempting to remove these by raising the temperature up to say 900° F. may cause polymerization, coking, or reaction of sulfur with the molecular sieve. Using higher temperature may injure the molecular sieve permanently. These difficulties can be avoided by using ammonia for removing the poisons from the molecular sieve.

The final step in the regeneration is the removal of $NH_3$ from the adsorbent. This can be done by moderate heating, up to not more than 700° F. The pressure can be reduced or an inert purge gas such as $CH_4$, $N_2$, $H_2$, etc. can be used as an aid in removing the ammonia. Ammonia regeneration not only removes the poisons, but also does not injure the molecular sieve.

Though the invention has been described in detail in the desorption of n-paraffins, it will be understood that the ammonia desorbent may be employed in removal of olefins, aromatics, acetylenes, oxygenated and sulfur-containing compounds, or whatever is adsorbed. As pointed out, the adsorbate is determined to a major extent by the size of the pore of the sieve.

What is claimed is:

1. In a process for the separation of straight chain hydrocarbons from mixtures by contacting said mixtures with zeolitic molecular sieves in an adsorption zone whereby said straight chain hydrocarbons are selectively adsorbed, the improvement which comprises desorbing said molecular sieves with gaseous ammonia and recovering said straight chain hydrocarbons.

2. The process of claim 1 wherein said desorption is carried out at a temperature below about 600° F.

3. The process of claim 2 wherein ammonia is stripped from the interstices of said sieves by raising the temperature in said adsorption zone to about 600–800° F.

4. The process of claim 3 wherein an inert purge gas is passed into said zone to aid in the stripping of adsorbed ammonia.

5. An improved process for upgrading naphthas produced by the catalytic hydroforming of virgin naphthas, which comprises passing vaporized hydroformate into a zeolitic molecular sieve adsorption zone, maintaining a temperature in said zone below about 600° F., adsorbing straight chain hydrocarbons from said feed, withdrawing an upgraded higher octane rating naphtha depleted in staight chain hydrocarbons from said zone, desorbing said straight chain hydrocarbons fom said sieves in said zone with gaseous ammonia at a temperature less than about 600° F., and thereafter passing an inert purge gas heated to a temperature above 600° F. to strip ammonia from said zone.

6. The process of claim 5 wherein said purge gas is nitrogen.

7. The process of claim 5 wherein desorption with ammonia is carried out at a temperature below about 400° F.

References Cited in the file of this patent

UNITED STATES PATENTS

| | | |
|---|---|---|
| 2,306,610 | Barrer | Dec. 29, 1942 |
| 2,586,889 | Vesterdal et al. | Feb. 26, 1952 |
| 2,818,455 | Ballard et al. | Dec. 31, 1957 |

OTHER REFERENCES

Barrer: "Quarterly Reviews (Chemistry Society)," vol. III, 1949, pp. 293–320, pages 297 and 304 only needed.

"Selective Adsorption of Zeolites," Chemical and Engineering News, vol. 32, November 29, 1954, page 4786 relied on.